US 11,840,860 B2

(12) United States Patent
Kent

(10) Patent No.: US 11,840,860 B2
(45) Date of Patent: *Dec. 12, 2023

(54) RETRACTABLE RV AND TRAILER COVER

(71) Applicant: Marine Concepts Acquisition, LLC, Kaiser, MO (US)

(72) Inventor: Randy Kent, Osage Beach, MO (US)

(73) Assignee: Marine Concepts Acquisition, LLC, Kaiser, MO (US)

( * ) Notice: Subject to any disclaimer, the term of this patent is extended or adjusted under 35 U.S.C. 154(b) by 50 days.

This patent is subject to a terminal disclaimer.

(21) Appl. No.: 17/542,877

(22) Filed: Dec. 6, 2021

(65) Prior Publication Data

US 2022/0098887 A1 Mar. 31, 2022

Related U.S. Application Data

(63) Continuation of application No. 16/005,669, filed on Jun. 11, 2018, now Pat. No. 11,193,293.

(60) Provisional application No. 62/517,853, filed on Jun. 9, 2017.

(51) Int. Cl.
 *E04B 1/12* (2006.01)
 *E04H 6/04* (2006.01)
 *B60J 11/04* (2006.01)
 *E04H 15/08* (2006.01)

(52) U.S. Cl.
 CPC .............. *E04H 6/04* (2013.01); *B60J 11/04* (2013.01); *E04H 15/08* (2013.01)

(58) Field of Classification Search
 CPC .................................. B60J 11/04; E04H 6/04
 See application file for complete search history.

(56) References Cited

U.S. PATENT DOCUMENTS

| 670,831 | A | 3/1901 | Allen et al. |
| 772,175 | A | 10/1904 | Palmer |
| 1,133,429 | A | 3/1915 | Christensen |
| 1,134,630 | A | 4/1915 | Mcgoldrick |
| 1,547,915 | A | 7/1925 | Hirn |
| 1,759,628 | A | 5/1930 | Vincenzo |

(Continued)

FOREIGN PATENT DOCUMENTS

| CA | 2088948 A1 | 8/1994 |
| CA | 2266802 A1 | 2/2000 |

(Continued)

*Primary Examiner* — Basil S Katcheves
(74) *Attorney, Agent, or Firm* — Fredrikson & Byron, P.A.

(57) ABSTRACT

A wheeled land vehicle covering system configured for one-person operation, the covering system having a covering system frame composed of a plurality of spaced apart uprights which support an overhead track from which a vehicle cover is suspended that is extendable along the track to cover a vehicle and which is retractable to uncover the vehicle. Each one of the uprights is height adjustable to adjust how far a top of the cover is above a roof of a vehicle to maintain a ventilation space therebetween. The cover is configured for one-person removal for storage when it is disposed in the fully retracted position. Such a cover also is configured for one-person installation when it is desired to reinstall the cover. The cover is attached by a hanger arrangement that enables extension and retraction of the cover by enabling relative extensible and retractable movement of the cover along the track.

20 Claims, 6 Drawing Sheets

(56) References Cited

U.S. PATENT DOCUMENTS

| | | | |
|---|---|---|---|
| 2,045,587 A | 6/1936 | Dean | |
| 2,586,369 A | 2/1952 | Miller | |
| 2,688,973 A * | 9/1954 | Reiman | E04H 6/04 |
| | | | 135/156 |
| 2,732,877 A | 1/1956 | Taylor | |
| 2,757,678 A | 8/1956 | Stahl | |
| 2,817,344 A * | 12/1957 | Teeter | E04H 15/52 |
| | | | 296/105 |
| 2,965,064 A | 12/1960 | Wallace | |
| 3,481,073 A | 12/1969 | Yoshida et al. | |
| 3,698,409 A | 10/1972 | Koontz et al. | |
| 3,749,107 A * | 7/1973 | Laberge | E04H 6/04 |
| | | | 135/117 |
| 4,019,212 A | 4/1977 | Downer | |
| 4,062,146 A | 12/1977 | Grossman et al. | |
| 4,084,599 A | 4/1978 | Matthews | |
| 4,247,509 A | 1/1981 | Talbot | |
| 4,284,095 A | 8/1981 | Norton | |
| 4,363,284 A | 12/1982 | Monroe | |
| 4,448,224 A | 5/1984 | Crain | |
| 4,487,212 A | 12/1984 | Moore | |
| D280,343 S | 8/1985 | Schultz | |
| 4,560,074 A | 12/1985 | Manning | |
| 4,683,902 A | 8/1987 | Wilson | |
| 4,741,375 A | 5/1988 | Milford et al. | |
| 4,830,427 A | 5/1989 | Fiocchi | |
| 4,844,109 A * | 7/1989 | Navarro | E04H 15/505 |
| | | | 52/109 |
| 4,991,612 A | 2/1991 | Kiss et al. | |
| 5,086,799 A | 2/1992 | Lumbleau | |
| 5,269,332 A | 12/1993 | Osborne | |
| D368,063 S | 3/1996 | Newton | |
| 5,564,358 A | 10/1996 | Newton | |
| 5,709,501 A | 1/1998 | Elbers | |
| 5,740,826 A | 4/1998 | Nevin et al. | |
| 5,769,105 A | 6/1998 | Margol et al. | |
| 5,775,353 A | 7/1998 | Johnson | |
| 5,839,237 A | 11/1998 | Davidson | |
| 6,062,243 A | 5/2000 | Tuch et al. | |
| 6,102,059 A | 8/2000 | Miller | |
| 6,167,658 B1 | 1/2001 | Weiner | |
| 6,321,872 B1 | 11/2001 | Parker | |
| 6,397,774 B1 | 6/2002 | Pranger | |
| 6,502,709 B1 * | 1/2003 | Parker | B60J 7/102 |
| | | | 212/328 |
| 6,659,035 B2 | 12/2003 | Treytiak | |
| 6,786,171 B1 | 9/2004 | Elbers | |
| 6,811,202 B2 * | 11/2004 | Hornady | B60P 7/04 |
| | | | 296/100.11 |
| 6,895,886 B1 | 5/2005 | Pawlowski et al. | |
| 7,001,104 B2 | 2/2006 | Edson | |
| 7,194,976 B1 | 3/2007 | Kramer | |
| 7,455,026 B2 | 11/2008 | Towley et al. | |
| 7,467,784 B2 | 12/2008 | Turner | |
| 7,536,965 B2 | 5/2009 | Johnson | |
| 7,819,262 B1 | 10/2010 | Ewan | |
| D630,288 S | 1/2011 | Grazioso | |
| 8,359,994 B1 | 1/2013 | Highfield | |
| 8,534,592 B2 | 9/2013 | Payne | |
| 8,601,971 B2 | 12/2013 | Kent | |
| 8,733,380 B1 * | 5/2014 | Roberts | B60J 11/04 |
| | | | 135/159 |
| 8,783,276 B2 | 7/2014 | Skrzynski et al. | |
| 8,911,174 B2 | 12/2014 | Hey et al. | |
| 9,073,735 B2 | 7/2015 | Byrd | |
| 9,187,923 B2 | 11/2015 | Skrzynski et al. | |
| 9,216,798 B2 | 12/2015 | Kent | |
| 9,404,281 B1 | 8/2016 | Donnay | |
| 9,409,628 B2 | 8/2016 | Kent | |
| 9,605,442 B2 | 3/2017 | Xie | |
| 9,765,545 B1 | 9/2017 | Petrenko | |
| 10,471,816 B1 * | 11/2019 | Young | B60J 7/08 |
| 2002/0083969 A1 | 7/2002 | Tung | |
| 2003/0000154 A1 | 1/2003 | Ignazio | |
| 2003/0019179 A1 | 1/2003 | Colson et al. | |
| 2003/0127198 A1 | 7/2003 | Court et al. | |
| 2005/0089375 A1 | 4/2005 | Fox | |
| 2005/0252542 A1 | 11/2005 | Basta | |
| 2007/0068634 A1 | 3/2007 | Unrast et al. | |
| 2007/0095271 A1 | 5/2007 | Yang | |
| 2008/0041431 A1 | 2/2008 | Tung | |
| 2008/0042027 A1 | 2/2008 | Lascala | |
| 2009/0031641 A1 | 2/2009 | Grazioso | |
| 2009/0178605 A1 | 7/2009 | Tufte | |
| 2009/0293797 A1 | 12/2009 | Kent | |
| 2011/0120514 A1 | 5/2011 | Skrzynski | |
| 2012/0180714 A1 | 7/2012 | Bir, Jr. | |
| 2014/0001138 A1 | 1/2014 | Byrd | |
| 2014/0007913 A1 * | 1/2014 | Jennings | E04H 6/04 |
| | | | 135/96 |
| 2014/0034099 A1 * | 2/2014 | Wang | B60J 11/04 |
| | | | 135/88.01 |
| 2014/0238455 A1 * | 8/2014 | Majer | B65D 71/14 |
| | | | 135/88.05 |
| 2015/0048289 A1 * | 2/2015 | Cornew | E04H 6/04 |
| | | | 254/394 |
| 2016/0289989 A1 * | 10/2016 | Creagh | E04H 6/04 |
| 2017/0016245 A1 | 1/2017 | Bailey et al. | |
| 2017/0284117 A1 | 10/2017 | Volin | |
| 2018/0043761 A1 * | 2/2018 | May | E04H 15/12 |
| 2018/0141679 A1 * | 5/2018 | Power | E04H 15/64 |
| 2019/0039445 A1 * | 2/2019 | Agbebaku | B60J 11/04 |
| 2019/0283842 A1 * | 9/2019 | Bejrowski | E04H 15/64 |

FOREIGN PATENT DOCUMENTS

| | | | |
|---|---|---|---|
| CA | 2452636 A1 | 6/2004 | |
| EP | 661233 A1 | 7/1995 | |
| GB | 191210018 A | 4/1913 | |
| GB | 191211873 A | 5/1913 | |
| GB | 191416123 A | 1/1915 | |
| GB | 607313 A | 8/1948 | |
| GB | 997211 A | 7/1965 | |
| JP | 10292657 A | 11/1998 | |
| SE | 514452 C2 | 2/2001 | |
| WO | 9921753 A1 | 5/1999 | |
| WO | 2007082403 A1 | 7/2007 | |
| WO | 2008014264 A2 | 1/2008 | |

* cited by examiner

RETRACTABLE RV AND TRAILER COVER

CROSS REFERENCE

This application is a continuation of U.S. Non-Provisional patent application Ser. No. 16/005,669, filed Jun. 11, 2018 (and issued as U.S. Pat. No. 11,193,293 on Dec. 7, 2021), which claims priority under 35 U.S.C. § 119(e) in U.S. Provisional Patent Application No. 62/517,853 filed Jun. 9, 2017, the entire disclosures of each of which are expressly incorporated herein by reference.

FIELD

The present invention is directed to a suspended cover for wheeled land vehicles that preferably is a trailer, motorhome, bus, or other type of recreational vehicle, and more particularly to a height-adjustable retractable suspended cover for such wheeled land vehicles.

BACKGROUND

While wheeled land vehicle covering systems have been attempted in the past, very few, if any, have enjoyed widespread commercial success, if any commercial success at all for various sundry reasons including cost, poor reliability, relatively short operation lives, and other factors. One type of wheeled land vehicle that has proved especially challenging to cover are larger wheeled land wheel vehicles, like motorhomes, travel trailers, campers, camper trailers and the like. There are times when it is desired to cover such relatively large wheeled land vehicles, including when they are not being used, e.g., during storage, to protect them from the elements, sun damage, wind damage and the like, which can weather, crack, chip, warp, and otherwise degrade the exterior of such relatively large wheeled land vehicles.

What is needed is a wheeled land vehicle covering system that is of simple, economical, reliable, durable and longlasting construction which is well suited for covering such relatively large wheeled land vehicles, including motorhomes, travel trailers, campers, camper trailers and the like.

SUMMARY

The present invention is directed to a wheeled land vehicle covering system configured for one-person operation that employs a frame and protective vehicle cover carried by the frame that is movable between a retracted position, thereby enabling a vehicle parked in a predefined or pre-designated covering area to be removed or enabling a vehicle to be parked in the covering area, and an extended position, where the vehicle cover is extended thereby covering a vehicle parked in the covering area. Such a vehicle cover is suspended from an elongate generally horizontally extending track that is disposed overhead the vehicle to be covered with the track carried by a plurality of spaced apart generally transversely extending horizontally booms supported on vertically height adjustable uprights. Each boom and pair of uprights defines a cover support of a frame of the covering system that preferably is both height adjustable and width adjustable.

Such a vehicle cover is made of a flexible, durable and resilient material, e.g., fabric, which not only protects an exterior of the vehicle from the elements, e.g., the sun, rain, wind, snow, sleet and hail, but also from impacts by birds and other falling objects. The material that such a vehicle cover is made from preferably also is breathable to permit moisture to escape, e.g., evaporate and/or pass through the cover, as well as to equalize humidity inside the cover to that of the ambient humidity outside the cover. Such a cover is of tented roof construction providing a ventilation air space between the roof of the vehicle and the top of the cover to help facilitate equalization of humidity and evaporation of moisture from the surface of the vehicle when covered with the cover.

Such a covering system is configured to permit retraction of the cover and position it in an out of the way stowaway position disposed at one end, preferably the rear end, of the vehicle. When retracted or urged to the stowaway position the cover preferably is urged, folded or bunched together enabling a single person to grasp the cover and remove it by detaching the cover from the track, such as for storage, cleaning, servicing, replacement or the like. In one preferably embodiment, the covering system can be configured with a release that is manipulable by the person to cause or facilitate detachment of the cover from the track so the person can then remove the cover.

These and other objects, features and advantages of this invention will become apparent from the following more detailed description of the invention and accompanying drawings.

DRAWING DESCRIPTION

One or more preferred exemplary embodiments of the invention are illustrated in the accompanying drawings in which like reference numerals represent like parts throughout and in which:

FIG. 1 is a top front right perspective view of a preferred embodiment of a retractable cover of a retractable wheeled land vehicle covering system of the present invention showing the cover partially covering a wheeled land vehicle that preferably is elongate recreation vehicle (RV) that can be a motorhome, travel trailer, camper, or the like;

Figure 5:
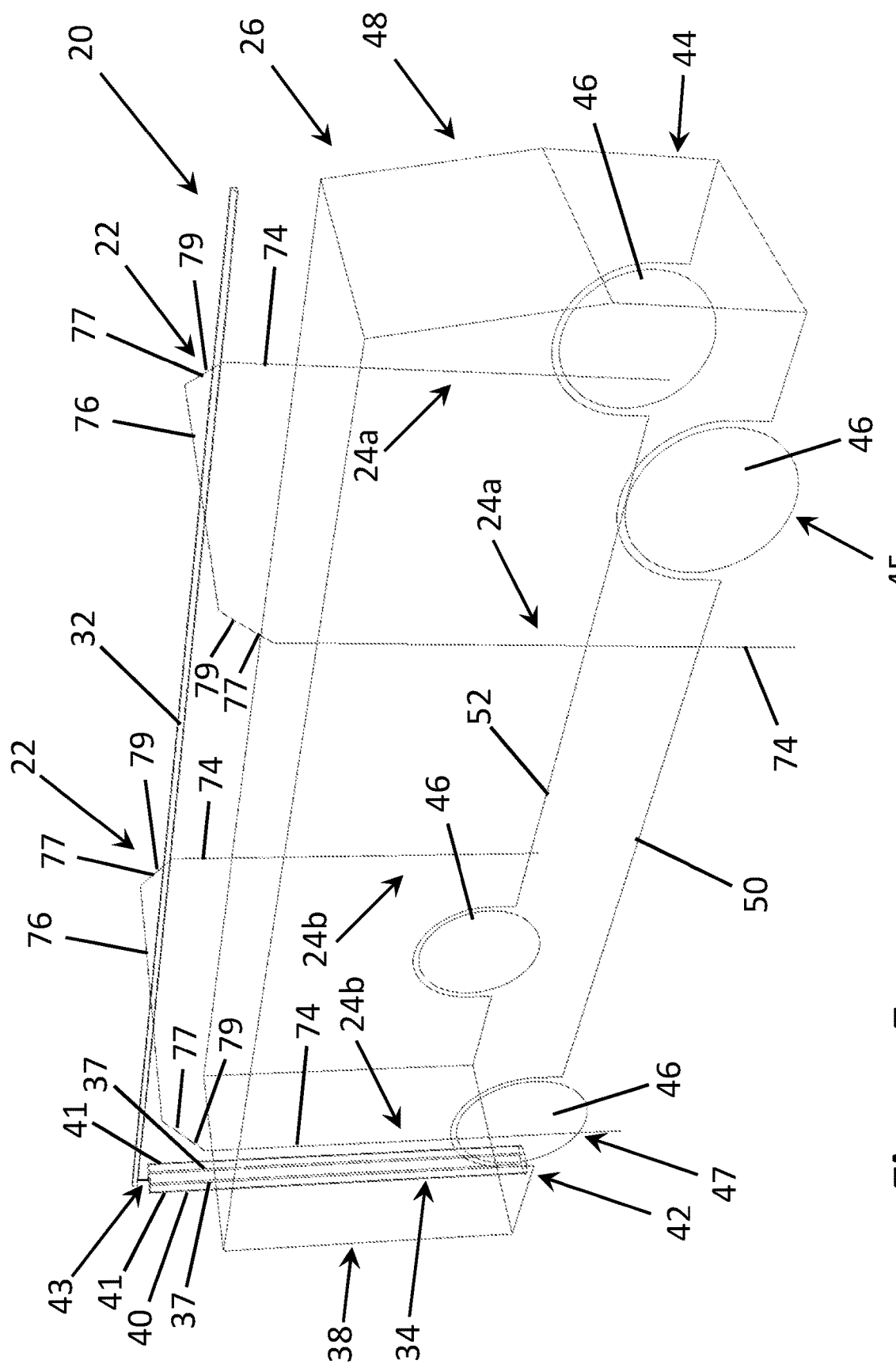
Figure 6:
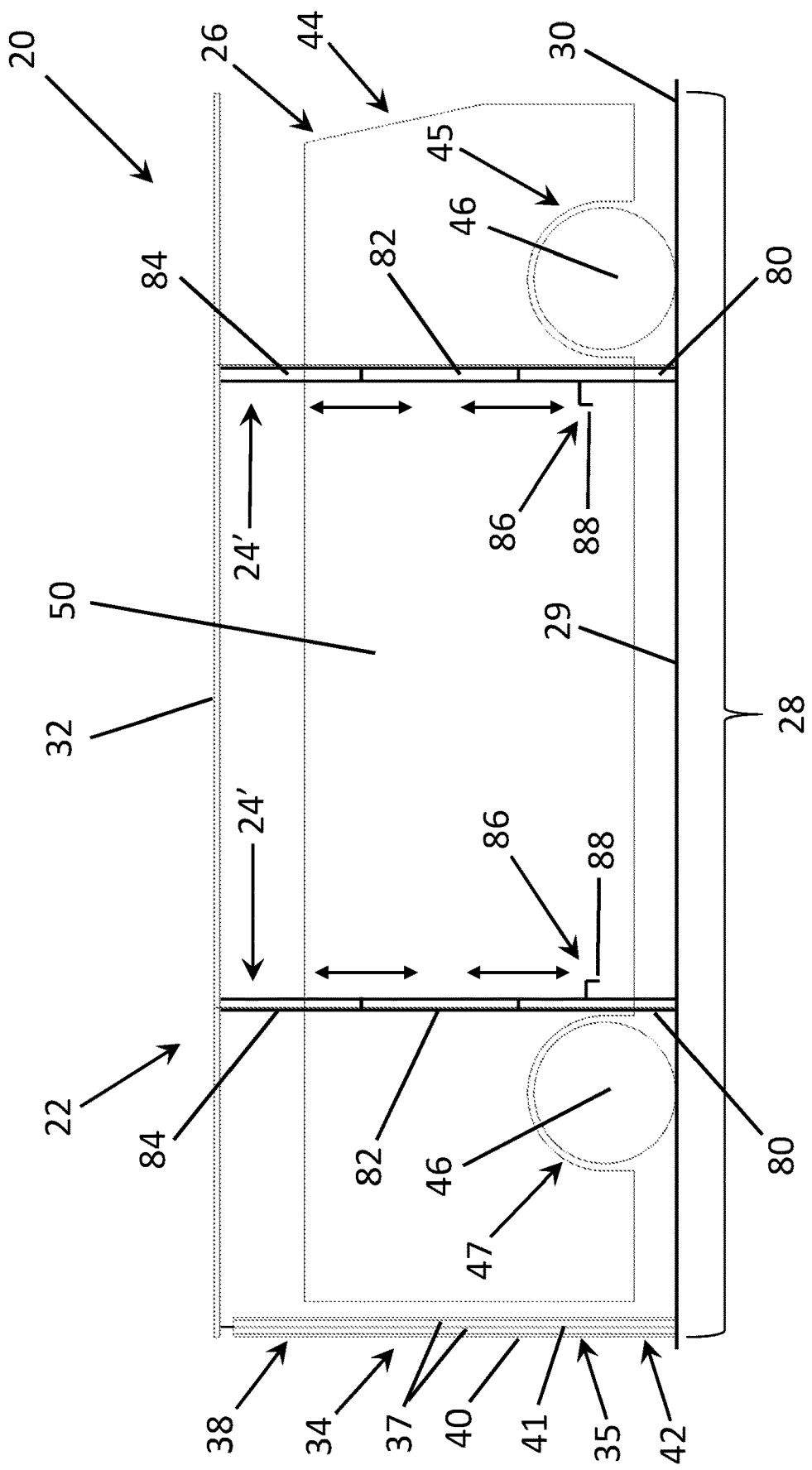

FIG. 5 is a top front right perspective view of the retractable wheeled land vehicle covering system and RV with the RV parked in a covering area of the ground underlying the wheels of the RV, and the cover of the retractable wheeled land vehicle covering system in a substantially completely retracted position; and FIG. 6 is a side elevation view illustrating the cover in a fully retracted position in an out of the stowaway position behind the RV parked on the covering area of the ground covered by the cover when fully extended with the fully retracted preferably disposed in a bundled and/or overlapped configuration that enables and preferably facilitates detachment and removal of the cover from the retractable wheeled land vehicle covering system.

Before explaining one or more embodiments of the invention in detail, it is to be understood that the invention is not limited in its application to the details of construction and the arrangement of the components set forth in the following description or illustrated in any appended drawings. The invention is capable of other embodiments, which can be practiced or carried out in various ways. Also, it is to be understood that the phraseology and terminology employed herein is for the purpose of description and should not be regarded as limiting.

DETAILED DESCRIPTION OF INVENTION

FIGS. 1-6 illustrate a preferred but exemplary embodiment of a one-person operable retractable wheeled land vehicle covering system 20 constructed in accordance with the present invention having a cover suspension frame 22 formed of at least a plurality of cover supports 24a, 24b spaced apart along the fore-aft length of a wheeled land vehicle 26 parked in a covering area 28 of a section of ground 30 upon which the vehicle 26 rests with the supports 24a, 24b carrying an elongate track 32 from which a retractable and extensible suspended wheeled land vehicle cover 34 can be and preferably is suspended. Such a retractable wheeled land vehicle covering system 20 of the invention is configured to enable the vehicle cover 26 to be movable, e.g., extendable and retractable, by a single person, e.g., a single user or a single operator, relative to the vehicle 26 along the track 32 between a fully extended covered vehicle position, like that shown in FIGS. 3 & 4, where the vehicle 26 is substantially completely covered by the cover 34, and a fully retracted uncovered vehicle position, like that shown in FIGS. 5 & 6, where the vehicle 26 is substantially uncovered.

Figure 4:
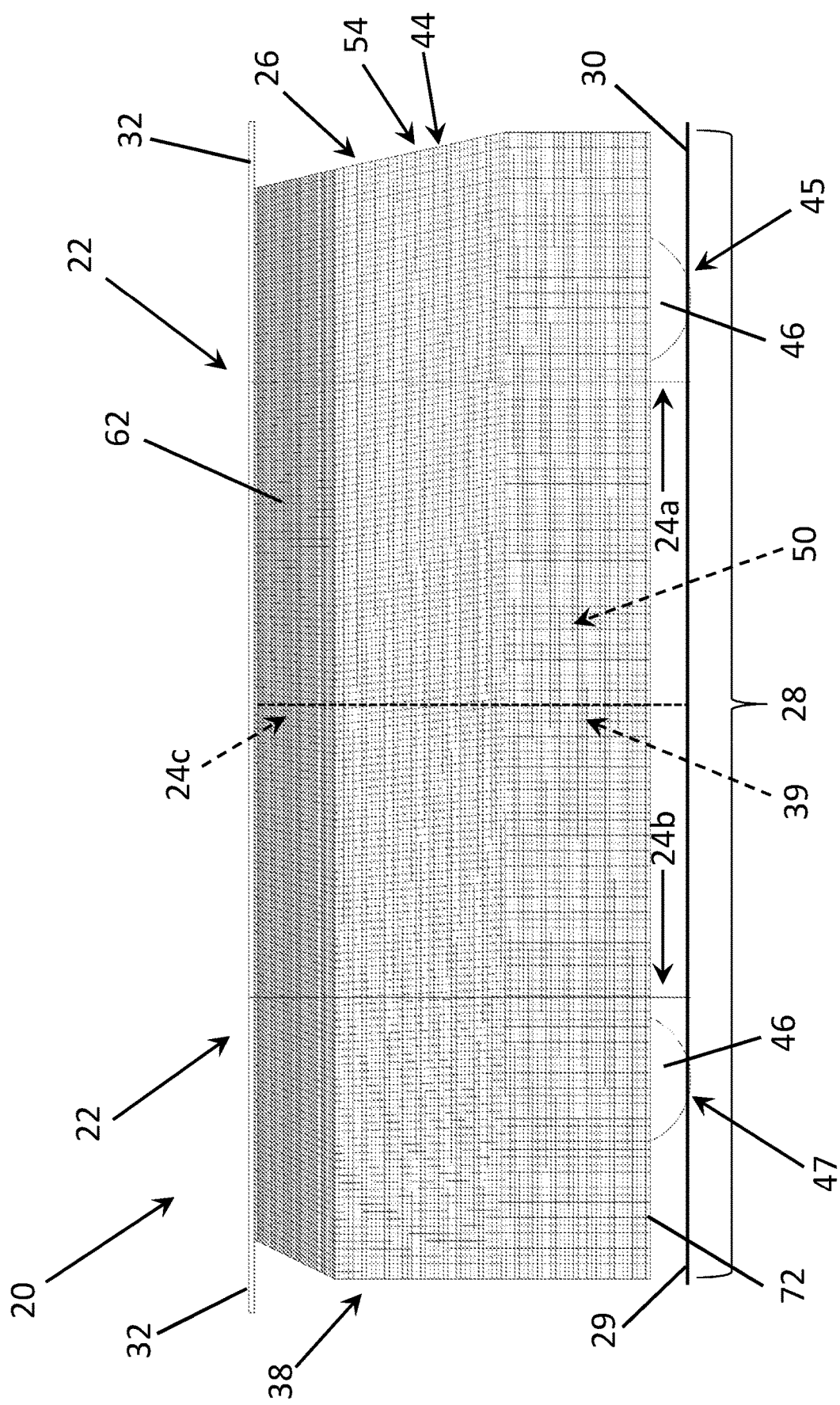
FIG. 4 is a side elevation view of the cover the retractable wheeled land vehicle covering system of FIG. 1 in the fully extended position substantially completely covering the RV.

While a preferred wheeled land vehicle covering system 20 constructed in accordance with the invention has a front or fore support 24a located adjacent or alongside a front set 45 of wheels 46 of the vehicle 26 and an aft or rear support 24b located adjacent or alongside a rear set 47 of wheels 46 of the vehicle 26, the covering system 20 can have a plurality of pairs, i.e., at least three, of the supports 24a, 24b, 24c, with one of the supports 24c shown in phantom in FIG. 4 being an intermediate support 24c disposed between the fore and aft supports 24a, 24b. With continued reference to FIG. 4, where such a covering system 20 is equipped with an intermediate support 24c, it preferably is located alongside a middle section 39 of the vehicle 26 located about halfway between a rear end 38 and front end 54 of the vehicle 26.

The covering area 28 is defined by a generally rectangular section of ground 30 disposed between and underneath the cover supports 24a, 24b that extends underneath the track 32, with the covering area 28 also defining a wheeled land vehicle parking target region 29 that provides a target in which a wheeled land vehicle 26 is to be parked that ensures the parked vehicle 26 will be disposed within the covering area 28 and can be covered by vehicle cover 34. Such a wheeled land vehicle parking target region 29 is generally defined by the wheeled land vehicle covering area 28 and provides a parking target to a person driving a vehicle 26 desired to be covered with the vehicle cover 34 of a wheeled land vehicle covering system 20 of the present invention when parking such a vehicle 26 desired to be covered with cover 34. As such, the cover supports 24a, 24b and track 32 carried by the supports 24a, 24b are configured to provide visual cues that define the wheeled land vehicle parking target region 29 when seeking to park a vehicle 26 within the covering area 28 of the covering system 20 the driver seeks to removably cover with cover 34.

Figure 3:
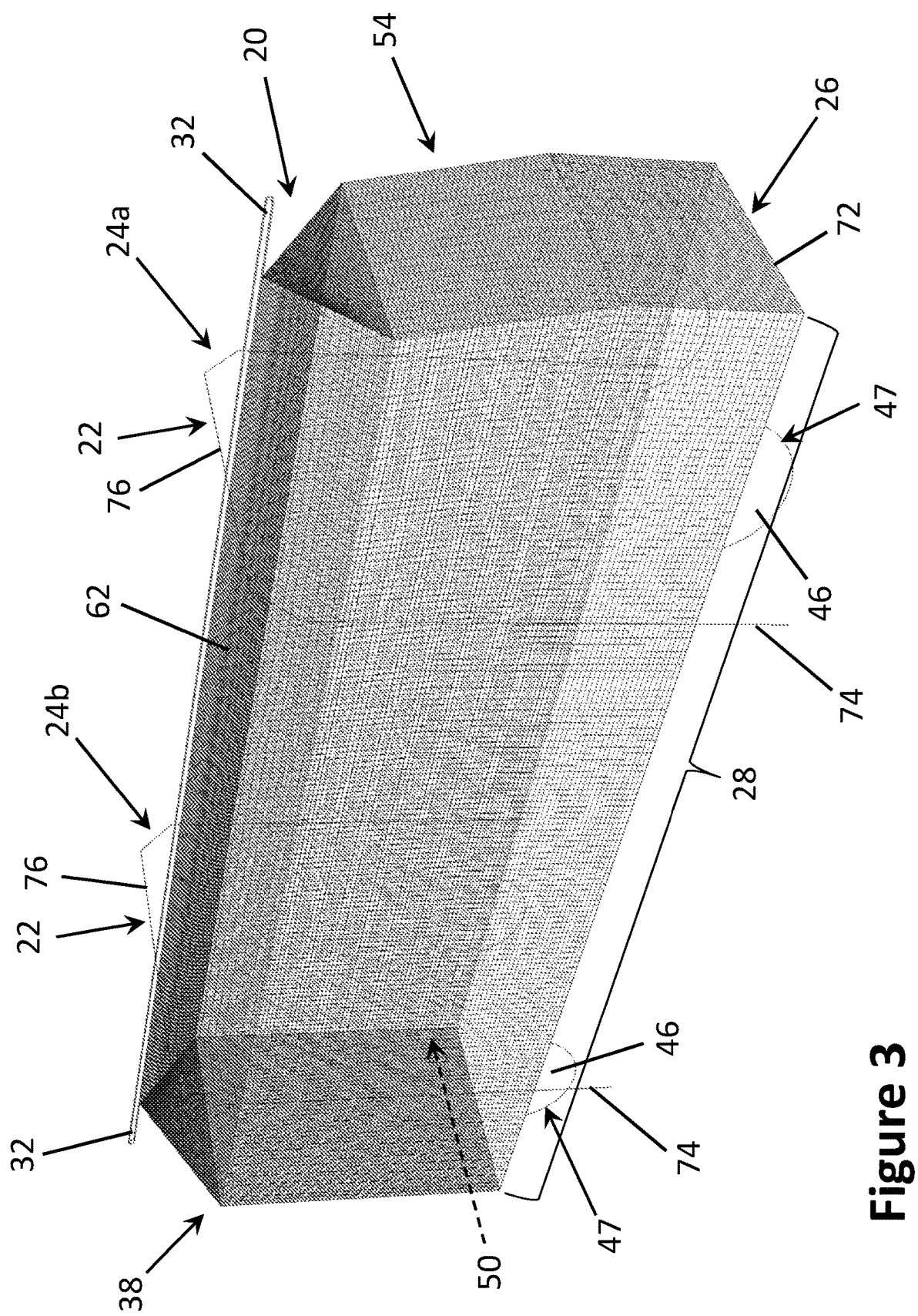
FIG. 3 is a top front right perspective view of the retractable wheeled land vehicle covering system of FIG. 1 with the cover in a fully extended position substantially completely covering the front and rear and both sides of the RV.

When the wheeled land vehicle cover 34 is disposed in a substantially fully extended position, like that depicted in FIGS. 3 and 4, a vehicle 26 parked in the covering area 28, i.e., vehicle parking target region 29, is substantially completely enshrouded or covered by the cover 34 thereby protecting the vehicle 26, including an exterior 25 of the vehicle 26, from the elements, including the sun, wind, rain, snow, sleet and hail. When the cover 34 is retracted, such as to a substantially completely retracted position, like that depicted in FIGS. 5 and 6, the vehicle 26 can be driven away and used. Conversely, when the cover 34 is disposed in its substantially completely retracted position, a vehicle 26 can be parked in the covering area 28 readying the vehicle 26 to be covered by the cover 34. As discussed in more detail below, when the cover 34 is disposed in the substantially fully retracted position, like that depicted in FIGS. 5 and 6, the cover 34 forms a relatively compact vertically hanging bunched-up or bunched-together arrangement 35 that can advantageously be removed from the covering system for storage by a single person, e.g., single user or single operator.

The retractable wheeled land vehicle covering system 20 of the present invention is advantageously constructed and arranged so the wheeled land vehicle cover 34 can be substantially completely retracted so as to be positioned in an out of the way stowaway position 36 disposed behind one end of the vehicle 26, preferably behind a rear end 38 of the vehicle 26, when the cover 26 is fully retracted. When disposed in the fully retracted position, the cover 34 is configured to collapse into a compact configuration or small enough footprint for one person to support, e.g., grab and hold, the cover 34 while removing the cover 34 from the track 32 for storage of the cover 32 at a location remote from the rest of the covering system 20. When the cover 34 is fully retracted, all portions of the cover 34 come together in a vertically-extending bunched-up or bunched-together arrangement 35, such as depicted in FIGS. 5 and 6, which has a relatively compact footprint 40 small enough in peripheral extent 41 that a single person can wrap both arms around the cover 34 enabling one-person removal of the cover 34 from the covering system 20. With continued reference to FIG. 6, one preferred wheeled land vehicle cover 34 is configured to collapse into a downwardly-hanging overlapped configuration 40 when moved along the track 32 to the fully retracted position with the cover 34 arranged to have or form at least a plurality, preferably at least a plurality of pairs, of folds or pleats 37 of the cover 34 overlapping one another.

Such a wheeled land vehicle cover 34 and wheeled land vehicle covering system 20 constructed in accordance with the present invention therefore also is configured for enabling one-person attachment of the cover 34 to the track 32. As such, a wheeled land vehicle covering system 20 and wheeled land vehicle cover 34 of the present invention is advantageously configured for one-person detachment from the track 32 and attachment to the track 32 preferably via a cover hanger arrangement 43 like that (a) shown in one or more of FIGS. 1-5 and described in commonly owned U.S. Pat. No. 7,194,976, and (b) shown in one or more of FIGS. 1-6 and described in commonly owned U.S. Pat. No. 9,409, 628, the entirety of each of which are expressly incorporated by reference herein. Track 32 preferably is elongate and has an upside U-shaped cross-section with inturned bottom wheel or roller supporting flanges like the track also shown and described in U.S. Pat. Nos. 7,194,976 and/or 9,409,628, the entirety of each of which are expressly incorporated by reference herein. The cover hanger arrangement can be or include at least a plurality, preferably at least a plurality of pairs, i.e., at least three rollers of the type further shown and described in U.S. Pat. No. 7,194,976 and/or U.S. Pat. No.

9,409,628 received in the elongate track 32 having an upside U-shaped cross-section with inturned bottom wheel or roller supporting flanges along which rollers or wheels of the rollers ride while the cover 34 is pulled or pushed during extending and/or retracting the cover 34. Such a covering system 20, cover 34, track 32 and hanger arrangement 43 are configured to enable one-person extension and retraction of the cover 34 by advantageously being configured to enable movement of the cover 34 via the hanger arrangement 43 along the track 32 between the fully retracted position and the fully extended vehicle covering position.

Such a wheeled land vehicle covering system 20 of the present invention is advantageously well suited for use to substantially completely previously hard to cover larger wheeled land vehicles that have previously been challenging, if not virtually impossible, to cover. This is particularly true of the preferred vehicle 26 shown in the drawing figures that is a relatively large wheeled recreational vehicle or RV 44 having at least two sets 45 and 47 of fore-aft spaced apart wheels 46 that support the vehicle 26 on the ground 30. A vehicle covering system 20 of the present invention advantageously is able to hold the weight of a cover 34 having a length, height and width sufficient, e.g., large enough, great enough, or big enough, to cover a class A motorhome 48 having a length of at least twenty-five feet, typically at least twenty-eight feet, and which can be between thirty feet and forty-five feet in length, a width of at least seventy inches, typically at least eighty-five inches, and which can be between ninety inches and one-hundred and five inches in length, and a height of at least nine feet, typically at least ten feet, and which can be between eleven and fourteen feet. Such a vehicle covering system 20 of the invention advantageously can further accommodate a cover 34 large enough to substantially completely cover such a class A motorhome 48 of such height, length and width dimensions including while a slide out is extended outwardly from both sides 50 and 52 of the vehicle with each slide out extending outwardly at least two feet, typically at least three feet, and which can extend outwardly between two feet and five feet from corresponding vehicle side 50 and/or 52.

As depicted in FIGS. 1-6, such a wheeled land vehicle covering system 20 of the invention is advantageously able to cover such a relatively large vehicle 26, such as the class A motorhome 48 shown, with a cover 34 that can be elongated along a length, width and/or height of the vehicle 26, which substantially completely covers a front 54, top or roof 56, both sides 50 & 52, and rear 38 of the vehicle 26. In a preferred embodiment, the cover 34 is suspended from the track 32 which overlies the roof 56 of the vehicle 26, preferably motorhome 48, and has a track length greater than the length of the vehicle 26, with the cover 34 extending downwardly below to adjacent a bottom edge 58 extending alongside a bottom 60 the vehicle 26, preferably motorhome 48, along the front 54, rear 38 and both sides 50 & 52 of the vehicle 26, preferably motorhome 48, when fully covering the vehicle 26, preferably motorhome 48. Where the vehicle 26 is an RV 44, such as a motorhome 48, such a covering system 20 has a vehicle cover 34 preferably is configured or constructed and arranged so that a bottom edge 72 of the cover 34 extends alongside the front 54, rear 38, and both sides 50 & 52 of the vehicle 26, e.g., motorhome 48, at least halfway down the front 54, rear 38, and both sides 50 & 52 of the vehicle 26, e.g., motorhome 48, when at least one of the slide outs of the RV 44, e.g., motorhome 48, is fully deployed and the cover 34 fully extended.

With reference to FIGS. 3 and 4, when the cover 34 is disposed in a fully extended position, the cover 34 has (a) a generally flexible tented top portion or roof 62 of generally triangular or Vee-shaped cross-section extending along substantially the entire length of the track 32 and overlying the entire generally rectangular vehicle roof 56, (b) a pair of generally flexible generally vertically downwardly extending sides 64 & 66 extending downwardly and outwardly from a respective side, branch or leg of the top cover portion 62 each having a respective panel 65 & 67 spaced apart by the vehicle 26, e.g., motorhome 48, which respectively hang downwardly alongside and generally parallel to a corresponding one of the sides 50 & 52 of the vehicle 26, e.g., motorhome 48, and (c) a pair of generally flexible generally vertically downwardly extending fore and aft cover portions 68 & 70 which respectively hang downwardly alongside corresponding front 54 and rear 38 of the vehicle 26, e.g., motorhome 48. The tented roof 62 of the cover 34 advantageously defines or provides a ventilation space 55 above the roof 56 of the vehicle 26, e.g., motorhome 48, which advantageously further enables water and condensation to escape. Such a tented roof 62 is formed of a pair of roof panels 61, 63 which are downwardly sloped or downwardly inclined so rain, snow, sleet, hail and the like slide downwardly off the roof 62 of the cover 34 onto the ground.

The aft portion 68 of the cover 34 is formed of a rear cover panel 69 extending between side panels 65 & 67 of the cover 34 which substantially completely overlies or overlaps the rear 38 of the vehicle 26, e.g., motorhome 48. At least the sides and aft portion, preferably also the fore portion, of the cover 34 extend downwardly from the top portion 62 of the cover 34 to a bottom edge 72 of the cover 34 that extends adjacent to and preferably alongside the bottom edge 58 of the vehicle 26, e.g., motorhome 48. In at least one cover embodiment, the cover 34 is constructed and arranged such that the bottom edge 72 of the fore and aft portions and both side portions of the cover 34 extend generally alongside and generally parallel to the bottom edge 58 of the vehicle 26, e.g., motorhome 48, the cover bottom edge 72 overlapping and/or disposed in contact with the bottom vehicle edge 58 substantially about the periphery of the vehicle 26, e.g., motorhome 48, with all slide-outs fully retracted. In at least one other cover embodiment, the cover 34 is constructed and arranged such that the bottom edge 72 of the fore and aft portions and both side portions of the cover 34 extend below the bottom edge 58 of the vehicle 26, e.g., motorhome 48, the cover bottom edge 72 overlapping and/or disposed in contact with the bottom vehicle edge 58 substantially about the periphery of the vehicle 26, e.g., motorhome 48, with all slide-outs fully retracted. In another embodiment, the cover 34 is constructed and arranged such that its bottom edge 72 extends below the bottom edge 58 of the vehicle 26, e.g., motorhome 48, such that at least both sides of the vehicle 26, e.g., motorhome 48, are substantially completely covered with a portion of each side or side panel of the cover 34 extending or hanging below the bottom edge 58 of the sides of the vehicle 26, e.g., motorhome 48, when the cover 34 is fully extended. In still another embodiment, the cover 34 is constructed and arranged such that its bottom edge 72 extends below the bottom edge 58 of the vehicle 26, e.g., motorhome 48, such that at least both sides and the front and rear of the vehicle 26, e.g., motorhome 48, are substantially completely covered with each one of the sides of the cover 34 and the fore and aft portions of the cover 34 extend or hang below the bottom edge 58 of the sides of the vehicle 26, e.g., motorhome 48, when the cover 34 is fully extended.

In one embodiment, the cover 34 of a wheeled land vehicle covering system 20 constructed in accordance with the present invention is configured or constructed and arranged with the bottom edge 72 of the cover 34 extending adjacent to but above the bottom edge 58 of the vehicle 26, e.g., motorhome 48, when the cover 34 is disposed in a fully extended position with one such embodiment of the cover 34 of the covering system 20 having its bottom edge 72 disposed above the vehicle bottom edge 58 but extending alongside a bottom quarter, e.g., bottom quarter-panel, of the vehicle 26, e.g., motorhome 48, such that at least three-quarters of both sides 50 & 52 of the vehicle 26, e.g., motorhome, is covered by the cover 34. In another embodiment, a vehicle covering system 20 constructed in accordance with the present invention has a cover 34 configured or constructed and arranged with its bottom edge 72 extending adjacent to but above the bottom edge 58 of the vehicle 26, e.g., motorhome 48, when the cover 34 is disposed in a fully extended position with at least one slide-out of the vehicle 26, e.g., motorhome 48, fully extended or deployed, with one such embodiment of the cover 34 of the vehicle covering system 20 configured or constructed and arranged such that its bottom edge 72 is disposed above the vehicle bottom edge 58 but extends alongside a bottom quarter, e.g., bottom quarter-panel, of the vehicle 26, e.g., motorhome 48, such that at least three-quarters of both sides 50 & 52 of the vehicle 26, e.g., motorhome 48, is covered by the cover 34 when at least one slide-out of the vehicle 26, e.g., motorhome 48, is fully deployed. In a further embodiment, a vehicle covering system 20 constructed in accordance with the present invention has a cover 34 configured or constructed and arranged with its bottom edge 72 extending adjacent to but above the bottom edge 58 of the vehicle 26, e.g., motorhome 48, when the cover 34 is disposed in a fully extended position while slide-outs on opposite sides of the vehicle 26, e.g., motorhome 48, are simultaneously deployed, with one such embodiment of the cover 34 of the vehicle covering system 20 configured or constructed and arranged such that its bottom edge 72 is disposed above the vehicle bottom edge 58 but extends alongside a bottom quarter, e.g., bottom quarter-panel, of the vehicle 26, e.g., motorhome 48, such that at least three-quarters of both sides 50 & 52 of the vehicle 26, e.g., motorhome 48, is covered by the cover 34 when slide-outs on opposite sides of the vehicle 26, e.g., motorhome 48, are simultaneously deployed.

In another embodiment, the fully extended cover 34 has a bottom edge 72 that extends adjacent and above the bottom edge 58 of the vehicle 26, e.g., motorhome 48, when the cover 34 is disposed in a fully extended position with one such embodiment of the cover 34 of the wheeled land vehicle covering system 20 having a bottom edge 72 disposed above the vehicle bottom edge 58 but extending alongside a bottom quarter or quarter-panel of the vehicle 26, e.g., motorhome 48, such that at least three-quarters of both sides 50 & 52 of the vehicle 26, e.g., motorhome 48, is covered by the cover 34, when at least one slide-out of the vehicle 26, e.g., motorhome 48, is fully extended or fully deployed. In still another embodiment, the fully extended cover 34 has a bottom edge 72 that extends adjacent and above the bottom edge 58 of the vehicle 26, e.g., motorhome 48, when the cover 34 is disposed in a fully extended position with one such embodiment of the cover 34 of the vehicle covering system 20 having a bottom edge 72 disposed above the vehicle bottom edge 58 but extending alongside a bottom quarter or quarter-panel of the vehicle 26, e.g., motorhome 48, such that at least three-quarters of both sides 50 & 52 of the vehicle 26, e.g., motorhome 48, is covered by the cover 34, when at least one slide-out of the vehicle 26, e.g., motorhome 48, is fully extended or fully deployed.

In still another embodiment, the fully extended cover 34 has a bottom edge 72 that extends below the bottom edge 58 of the vehicle 26, e.g., motorhome 48, when the cover 34 is disposed in a fully extended position with one such preferred cover 34 of the wheeled land vehicle covering system 20 having a bottom edge 72 disposed below the vehicle bottom edge 58 but spaced above the ground 30 at least one inch when fully extended to substantially completely cover the vehicle 26, e.g., motorhome 48, having at least one slide out extended. Where the vehicle 26 is an RV 44, such as a motorhome 48, such a vehicle covering system 20 and cover 34 preferably is configured or constructed and arranged so that a bottom edge 72 of the cover 34 extends alongside the front 54, rear 38, and both sides 50 & 52 of the vehicle 26, e.g., motorhome 48, greater than halfway down the front 54, rear 38, and both sides 50 & 52 of the vehicle 26, e.g., motorhome 48, when at least one of the slide outs of the RV 44, e.g., motorhome 48, is fully deployed and the cover 34 fully extended.

Figure 1:
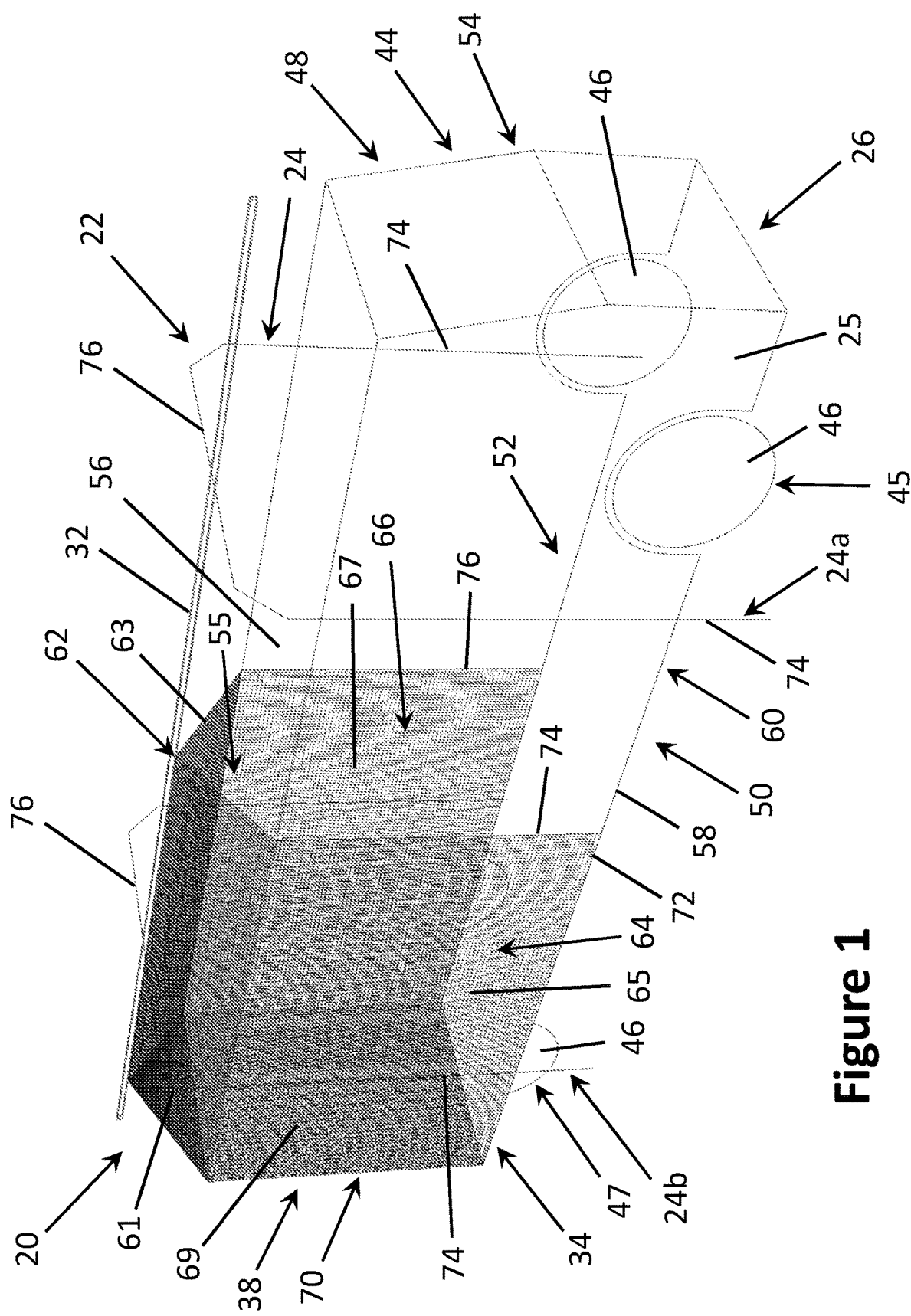
Figure 2:
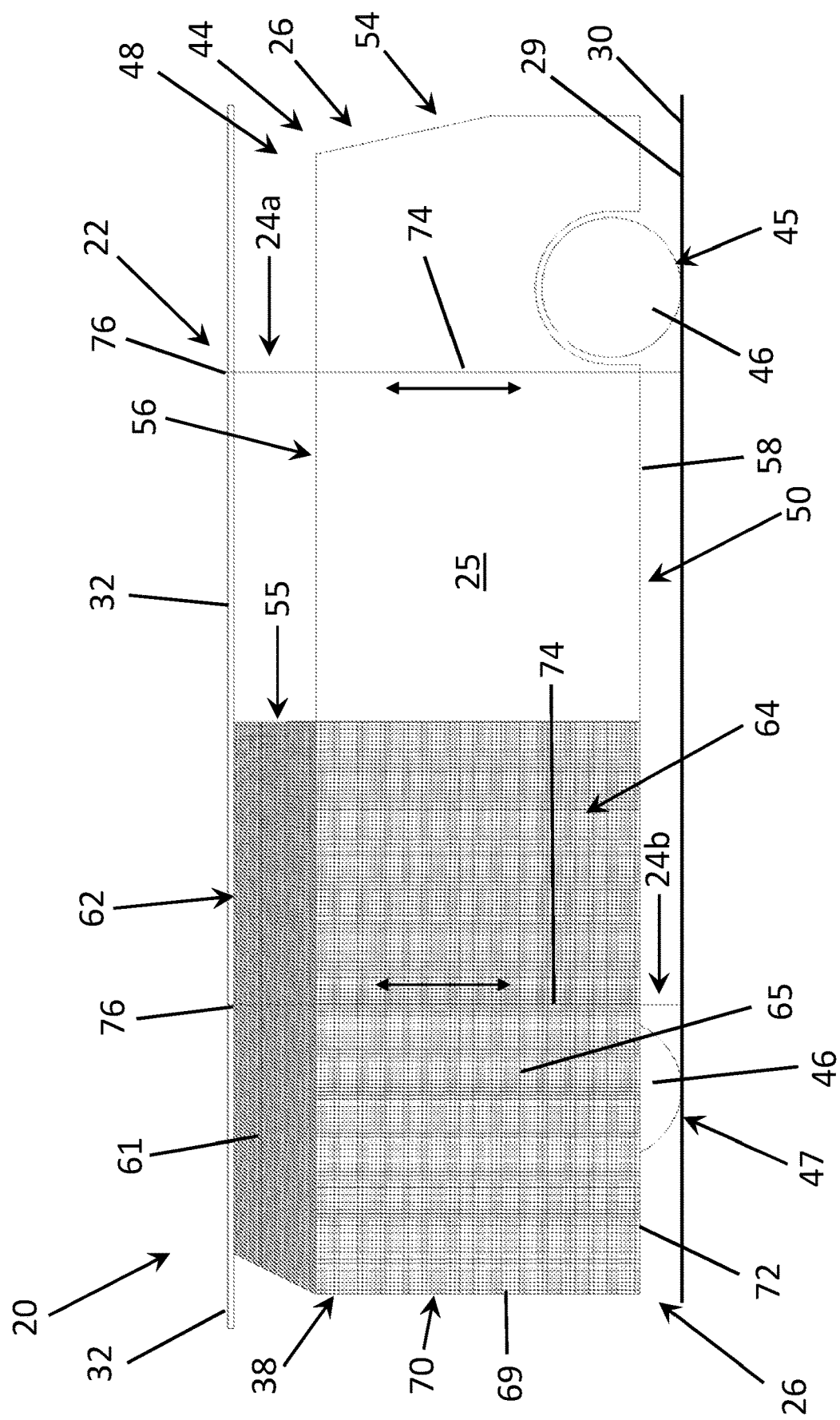
FIG. 2 is a side elevation view of one side of the cover of the retractable wheeled land vehicle covering system of FIG. 1 with the cover partially extended along a corresponding side of the RV partially covering the top and sides of the RV.

During use and operation, such a cover 34 of a wheeled land vehicle covering system 20 in accordance with the present invention can be manually grasped at or adjacent one of the leading front side edges 75 & 76 of respective forwardly disposed or leading portions of corresponding panels of the cover 34 by a user or operator and pulled forwardly translating or displacing one or more portions of the cover 34 along the track 32 relative to the track 32 thereby extending the cover 34 from at or adjacent a rearward retracted position, such as the fully retracted position shown in FIGS. 5 & 6, forwardly towards a fully extended position, like the fully extended position shown in FIGS. 2 & 3, substantially completely covering the vehicle 26, e.g., motorhome 48. When the cover 34 grasped and pulled forwardly when the cover 34 is fully retracted and rearwardly disposed in a bunched up or overlapping compact or minimized footprint configuration, like the downwardly hanging overlapped configuration 40 depicted in FIGS. 5 & 6, grasping and pulling part of the cover 34 generally forwardly towards a front of the vehicle 26, e.g., motorhome 48, being covered unfurls overlapping and/or bunched up portions of the initially stowaway-ready cover 34 as sides of the cover 34 are pulled along the track 32 around the rear of the vehicle 26, e.g., motorhome 48, and along opposites sides of the vehicle 26, e.g., motorhome 48.

Even when the cover 34 is disposed in its fully retracted stowaway position or condition depicted in FIGS. 5 & 6, such as when disposed in a bunched-together, bundled together and/or overlapped minimal footprint configuration, like that depicted in FIGS. 5 & 6, the cover 34 is suspended from the track 32 which in turn is carried by fore-aft spaced apart supports 24a, 24b of the cover suspension frame 22. When unfurled from the bunched-together, bundled together and/or overlapped minimal footprint configuration, like that depicted in FIGS. 5 & 6, the suspended cover 34 rides along the track 32 which is substantially immovably fixed in place by being rigidly fixed to the supports of the frame 22 enabling movement of the cover 34 between the fully extended and fully retracted positions, such as those respectively depicted in FIGS. 3 & 4 and 5 & 6. In one embodiment, the cover 34 can be suspended from a track 32 in the manner (a) shown in one or more of FIGS. 1-5 and/or described in commonly owned U.S. Pat. No. 7,194,976, and/or (b) shown in one or more of FIGS. 1-6 and/or described in commonly owned U.S. Pat. No. 9,409,628, the entirety of each of which are expressly incorporated by reference herein. In one preferred embodiment, at least a plurality, preferably at least a plurality of pairs, i.e., at least three rollers of the type shown and described in one or more of U.S. Pat. No. 7,194,976 and/or U.S. Pat. No. 9,409,628 received in an elongate track 32 having an upside U-shaped cross-section with inturned bottom wheel or roller supporting flanges along which rollers or wheels of the rollers ride while the cover 34 is pulled or pushed during extending and/or retracting the cover 34.

If desired, the track 32 can be adjustably attached or mounted to one or more of all of the supports 24a, 24b of the cover suspension frame 22 in a manner that enables adjustment, e.g., fine or micro adjustment, of the position of the track 32 relative to one or more or each one of the supports 24a, 24b of the cover suspension frame 22 enabling adjustable positioning of one or more portions of the track 32 and/or cover 34 suspended from the track 32 relative to one or more or each one of the supports 24a, 24b of the cover suspension frame 22. If desired, the track 32 can be adjustably mounted to the supports 24a, 24b in a manner similar to or like that depicted in one or more of FIGS. 13-16 and/or described in commonly owned U.S. Pat. No. 9,216,798, the entirety of which is expressly incorporated by reference herein. If desired, the track 32 can be mounted, preferably adjustably mounted to a beam, which in turn is adjustably mounted to the supports 24a, 24b in a manner like depicted in one or more of FIGS. 13-16 and/or described in commonly owned U.S. Pat. No. 9,216,798.

In a preferred embodiment, the track 32 can be adjustably mounted to the supports 24a, 24b of the frame 22 enabling the height and/or positioning of the track 32 and/or cover 34 above the roof of the vehicle 26, e.g., motorhome 48, and/or the ground 30 from which the cover 34 is suspended and/or attached to the track 32 to be adjusted. If desired, the track 32 can be attached to or mounted on a beam carried by or attached to one or more of all of the supports 24a, 24b of the cover suspension frame 22, such as in the manner depicted in one or more of FIGS. 13-16 and/or described in commonly owned U.S. Pat. No. 9,216,798 the entirety of which is expressly incorporated by reference herein. In one embodiment. Track 32 can be adjustably mounted to the beam and/or beam can be adjustably mounted to one or more or each one of the supports 24a, 24b of the frame 22 in accordance with the manner and/or arrangement employed to carry out adjustable mounting of the beam to the booms in FIGS. 13-16 and/or as described in commonly owned U.S. Pat. No. 9,216,798 and/or the track to the beams in FIGS. 13-16 and/or as described in commonly owned U.S. Pat. No. 9,216,798.

If desired, the track 32 can be adjustably attached or mounted to one or more of all of the supports 24a, 24b of the cover suspension frame 22 in a manner that enables height adjustment, e.g., fine or micro height adjustment, of the height above the roof of the vehicle 26, e.g., motorhome 48, and/or the ground 30 from which the cover 34 is suspended and/or attached to the track 32. If desired, the track 32 can be adjustable attached to or mounted on a beam carried by or attached to one or more of all of the supports 24a, 24b of the cover suspension frame 22, such as in the manner depicted in one or more of FIGS. 13-16 of commonly owned U.S. Pat. No. 9,216,798 the entirety of which is expressly incorporated by reference herein.

Cover 34 can be made of a woven or non-woven fabric, a fabric composed partially or completely of polytetrafluoroethylene (PTFE), such as GORE-TEX or the like, vinyl, canvas, or another type of suitable cover fabric including those disclosed in one or more of U.S. Pat. Nos. 7,194,976, 9,216,798, and/or 9,409,628. The leading edges or ends of the cover 34 preferably are releasably attachable to one another in a manner that joins them together around the front end of the vehicle 26, e.g., motorhome 48, such as by using a hook and loop attachment arrangement, e.g., VELCRO, a zipper or zipper arrangement, or another suitable type of releasable fastening arrangement including one or more such releasable fastening arrangements, engagement arrangements, or the like disclosed in one or more of U.S. Pat. No. 9,216,798, and/or U.S. Pat. No. 9,409,628.

If desired, a portion of the cover 34 extending about enough of the periphery of the vehicle 26, e.g., motorhome 48, being covered thereby is configured or otherwise constructed and arranged to be at least partially tightened around, brought into engagement or otherwise urged against one or more of the sides, front and/or rear of the vehicle 26, e.g., motorhome 48 to help secure the cover 34 around and to the vehicle 26, e.g., motorhome 48. In one preferred embodiment, the cover 34 is configured to be releasably cinched around and against the sides, front and/or rear of the vehicle 26, e.g., motorhome 48, such as in the manner shown in FIGS. 2-4 and/or FIGS. 7-11 of U.S. Pat. No. 9,409,628. If desired, such a cinching arrangement can be formed in, with or of part of a band or tube within the cover 34 that extends substantially about the entire periphery of the vehicle 26, e.g., motorhome 48, such as at or adjacent the bottom edge 72 of the cover 34, enabling releasable cinching or tightening of the cover 34 against the vehicle 26, e.g., motorhome 48.

In another preferred embodiment, a wheeled land vehicle covering system 20 of the present invention can be constructed and arranged or otherwise configured with a drive (not shown) carried by or mounted to part of the frame 22, such as to one or more of the supports 24a, 24b of the frame 22, and disposed in operable cooperation with a track 32 and top portion of the cover 34 enabling automated displacement or translation of the cover 34 relative to the track 32 by the drive thereby enabling automated extension and retraction of the cover 34 using the drive. Such a drive can be and preferably is remotely controlled, such as via a hand-held wireless remote operable by an operator of the vehicle 26, e.g., motorhome 48, from within the vehicle 26. If desired, such a drive can be in the form of a cable, chain or belt driven garage door opener (not shown) with its cable, chain or belt operatively connected or otherwise operably coupled to one or more of the rollers in the track 32 from which the top portion of the cover 34 is suspended to displace one or of the rollers in a desired direction relative to the track 32 depending on whether the cover 34 is being extended or retracted. Such a modified or adapted garage door opener can be carried by or otherwise mounted to part of the suspension frame 22, such as carried by or mounted to one of the supports 24a, 24b of the frame 22, with the wireless remote of the garage door operable by a driver or occupant of the vehicle 26, e.g., motorhome 48, from within the vehicle 26, e.g., motorhome 48, to extend or retract the cover 34 while within the vehicle 26, e.g., motorhome 48.

Each one of the supports 24a, 24b of the frame 22 of a wheel land vehicle covering system 20 constructed in accordance with the present invention can and preferably does have a generally upwardly extending upright 74 and a track and cover supporting boom 76 extending generally outwardly therefrom that carries the track 32 from which the cover 34 is removably suspended. In one embodiment, the upright 74 of each support 24a, 24b is length adjustable producing a height-adjustable upright 74 producing a height-adjustable wheeled land vehicle covering system 20 enabling the height of the track 32 from the ground 30 to be adjusted for vehicles of different heights. In one embodiment, the height adjustable supports 24a, 24b, constructed with height adjustable uprights 74, enabling the top portion 62 of the cover 34 to be suspended or hung from the track 32 at least one foot, preferably at least a plurality of feet, above the roof 56 of the vehicle 26, e.g., motorhome 48, to enable the sides of the cover 34 to easily slide or flow around and along opposite sides of the vehicle 26, e.g., motorhome 48, during extension of the cover 34 when covering the vehicle. Each generally vertically extending upright 74 is joined to a generally horizontally extending overhead boom 76 by an inclined corner coupler 77 that preferably functions are a joint 79 that strengthens each respective support 24a, 24b.

Each such length and height adjustable upright 74 can be of telescoping construction such as in the form of a telescoping tubular pole, post or the like formed of at least a plurality, preferably at least a plurality of pairs, i.e., at least three, tubular telescoping sections that enable height adjustment with a locking arrangement that is employed to substantially immovably fix the length of the height adjustable upright 74 once telescoped to the desired length to achieve the desired trach and cover height. Another preferred height adjustable upright construction is in the form of a length adjustable upright 74 formed of a plurality, preferably at least a plurality of pairs of, i.e. at least three, sections or segments, each of which can be tubular, which can be coupled, stacked, attached, mounted or otherwise disposed end-to-end with as many such sections or segments arranged end-to-end and fixed together as needed or desired to achieve the desired upright length to achieve the desired track and cover height.

With reference to FIG. 6, each upright 74 of each support 24a, 24b is formed of a plurality, preferably a plurality of pairs, of upright segments 80, 82, 84, which each preferably are tubular, at least a plurality of upright segments 82, 84 of which are vertically displaceable relative to at least one of the upright segments 80 enabling the respective boom 76 and track 32 to be raised or lowered relative to the roof 56 of the vehicle 26, e.g., motorhome, to be covered with cover 34. In a preferred embodiment, top upright segment 84 is telescopically movable relative to intermediate upright segment 82 and intermediate upright 82 is telescopically movable relative to the bottom or fixed upright segment 80. An actuator 86, such as a hand crank 88, can be and preferably is used to telescopically selectively raise or lower each one of the telescopically vertically displaceable upright segments 82 and/or 84 relative to the fixed or bottom upright segment 80 to raise or lower the track 32. Raising or lowering the track 32 in this manner enables the top or roof of the cover 34 to be raised or lowered relative to the roof 56 of the vehicle 26, e.g., motorhome, being covered by cover 34.

The boom 76 preferably also is length adjustable thereby enabling adjustment of at least the lateral or horizontal position of the track 32 from the upright 74 of the support 24a or 24b or supports 24a and 24b so the track 32 generally overlies the center of the roof 56 of the vehicle 26, e.g., motorhome 48, to position the upper portion of the cover 34 generally over the center of the roof 56 of the vehicle. In one preferred embodiment, the length adjustable boom 76 is of telescopic construction constructed much like the telescopic length and height adjustable upright discussed above with a locking device employed to substantially immovably fix the length of the boom when the desired position of the track and cover relative to the vehicle is achieved. In another preferred embodiment, the boom 76 is formed of elongate segments or sections which can be tubular and which can be and preferably are attachable to one another such as in an end-to-end arrangement as needed to achieve the desired length desired to position the track 32 and cover 34 relative to the vehicle when parked in the covering space to ensure proper covering of the vehicle 26 with the cover.

In one preferred embodiment of a wheeled land vehicle covering system 20 constructed in accordance with the present invention, each one of the supports 24a, 24b of the cover suspension frame 22 is of downturned or upside-down U-shaped construction such that each support 24a, 24b is formed of a pair of uprights 74 disposed on or along opposite sides of a vehicle, e.g., motorhome, parked in the covering area, between which extends an elongate track-carrying boom 76. At least one and preferably both of the vertical uprights 74 of each such downturned and/or upside down U-shaped support 24a, 24b is of length and height adjustable construction to enable macro-height adjustment of the height of the track 32 and/or height of the upper portion of the cover 34 above the roof of the vehicle, e.g., motorhome and ground. Such height adjustably advantageously enables resizing or adjustment of the frame 22 via upright length and height adjustment to accommodate vehicles, e.g., motorhomes, of different heights. Each generally horizontal boom 76 of each such downturned upside down U-shaped support 24a, 24b extending between the vertical uprights 74 is length-adjustable to enable the space between the uprights 74 to which the boom 76 is connected to be adjusted such as to adjustably size the frame 22 for vehicles, e.g., motorhomes, of different widths.

If desired, the covering system 20 preferably includes a wireless remote that remotely controls operation and which is manipulable or operable to at least one of extend the cover covering a vehicle parked in the covering area and retract the cover from the vehicle uncovering the vehicle. Such a wireless remote preferably is of handheld construction that can be handheld during use and operation including during cover extension and retraction.

Understandably, the present invention has been described above in terms of one or more preferred embodiments and methods. It is recognized that various alternatives and modifications can be made to these embodiments and methods that are within the scope of the present invention. It is also to be understood that, although the foregoing description and drawings describe and illustrate in detail one or more preferred embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims.

It is claimed:

1. A retractable cover system for removably covering a wheeled land vehicle when the wheeled vehicle is parked on ground adjacent to the retractable cover system, the retractable cover system comprising:
    (a) an upstanding frame extending upwardly from the ground;
    (b) an elongate track extending a length, the elongate track being carried by the frame and overlying the wheeled land vehicle when the wheeled land vehicle is parked on ground adjacent to the retractable cover system; and (c) a downwardly hanging cover carried by the track, the cover movable between a retracted uncovered position for uncovering the wheeled land vehicle and an extended covered position for covering the wheeled land vehicle, the cover hanging downwardly from the track along a first length of the track when in the extended covered position, the cover hanging downwardly from the track along a second length of the track when in the retracted uncovered position, the second length being less than the first length.

2. The retractable wheeled land vehicle cover system of claim 1, wherein the track comprises an adjustable height above the ground.

3. The retractable wheeled land vehicle cover system of claim 2, wherein the cover extends around a rear of the wheeled land vehicle, the cover having one side panel extending along one side of the wheeled land vehicle when the cover is extended toward the covered position and another side panel extending along an opposite side of the wheeled land vehicle when the cover extended toward the covered position.

4. The retractable wheeled land vehicle cover system of claim 3, wherein the cover gathers behind the rear of the wheeled land vehicle when the cover is moved to the retracted uncovered position.

5. The retractable wheeled land vehicle cover system of claim 4, wherein the cover hangs downwardly from the track substantially the length of the wheeled land vehicle when the cover is moved to the extended covered position.

6. The retractable wheeled land vehicle cover system of claim 4, wherein the cover has a bottom edge that extends downwardly at least as far as a bottom edge extending alongside a bottom of the wheeled land vehicle.

7. The retractable wheeled land vehicle cover system of claim 6, wherein the cover is a breathable flexible fabric configured to allow moisture to pass therethrough.

8. The retractable wheeled land vehicle cover system of claim 7, wherein the cover has a pitched roof from the track when disposed in the extended covered position providing a ventilation air space between a roof of the vehicle and a portion of the cover forming the pitched roof.

9. The retractable wheeled land vehicle cover system of claim 8, wherein the cover comprises a cover fabric comprised of polytetrafluoroethylene.

10. The retractable wheeled land vehicle cover system of claim 9, wherein the cover fabric is GORE-TEX.

11. The retractable cover system of claim 1, wherein the cover is attached to the track along the first length of the track when in the extended covered position and attached to the track along the second length when in the retracted uncovered position.

12. The retractable cover system of claim 1, wherein the cover includes a cover edge having a cover edge length, wherein the cover edge length is attached to the track along the first length of the track when in the extended covered position and attached to the track along the second length when in the retracted uncovered position.

13. A retractable cover system for removably covering a land vehicle when the wheeled vehicle is parked on the ground adjacent to the retractable cover system, the retractable cover system comprising:
  (a) an upstanding frame extending upwardly from the ground, the frame having a pair of spaced apart cover supports, each one of the cover supports having a pair of elongate vertically adjustable uprights generally interconnected by an elongate length-adjustable overhead boom;
  (b) an elongate track extending a length, the elongate track being carried by the frame and overlying the wheeled land vehicle at least a length of the wheeled land vehicle when the wheeled land vehicle is parked on ground adjacent to the retractable cover system; and
  (c) a downwardly hanging cover carried by the track, the cover movable between a retracted uncovered position for uncovering the wheeled land vehicle and an extended covered position for covering the wheeled land vehicle, the cover hanging downwardly from the track along a first length of the track when in the extended covered position, the cover hanging downwardly from the track along a second length of the track when in the retracted uncovered position, the second length being less than the first length.

14. The retractable wheeled land vehicle cover system of claim 13, wherein the cover is a breathable flexible fabric configured to allow moisture to pass therethrough.

15. The retractable wheeled land vehicle cover system of claim 14, wherein the cover has a pitched roof from the track when disposed in the extended covered position providing a ventilation air space between a roof of the vehicle and a portion of the cover forming the pitched roof.

16. The retractable wheeled land vehicle cover system of claim 15, wherein the cover comprises a cover fabric comprised of polytetrafluoroethylene.

17. The retractable wheeled land vehicle cover system of claim 16, wherein the cover fabric is GORE-TEX.

18. A retractable cover system for removably covering a land vehicle when the wheeled vehicle is parked on ground adjacent to the retractable cover system, the retractable cover system comprising:
  (a) an upstanding frame extending upwardly from the ground, the frame having a pair of spaced apart cover supports, each one of the cover supports having a pair of elongate vertically adjustable uprights generally interconnected by an elongate length-adjustable overhead boom;
  (b) an elongate track extending a length, the elongate track being carried by the frame and overlying the wheeled land vehicle when the wheeled land vehicle is parked on the ground adjacent to the retractable cover system at least a length of the wheeled land vehicle; and
  (c) a downwardly hanging cover carried by the track, the cover movable between a retracted uncovered position for uncovering the wheeled land vehicle and an extended covered position for covering the wheeled land vehicle when the wheeled land vehicle is parked on ground adjacent to the retractable cover system, the cover hanging downwardly from the track along a first length of the track when in the extended covered position, the cover hanging downwardly from the track along a second length of the track when in the retracted uncovered position, the second length being less than the first length; and
  wherein the cover extends around a rear of the wheeled land vehicle, the cover having one side panel extending along one side of the wheeled land vehicle when the cover is extended toward the covered position and another side panel extending along an opposite side of the wheeled land vehicle when the cover extended toward the covered position.

19. The retractable wheeled land vehicle cover system of claim 18, wherein the cover gathers behind the rear of the wheeled land vehicle when the cover is moved to the retracted uncovered position.

20. The retractable wheeled land vehicle cover system of claim 18, wherein the cover has a pitched roof from the track when disposed in the extended covered position providing a ventilation air space between a roof of the vehicle and a portion of the cover forming the pitched roof.

\* \* \* \* \*